(12) United States Patent
Zhou et al.

(10) Patent No.: US 9,097,236 B2
(45) Date of Patent: Aug. 4, 2015

(54) METHOD OF OPERATING A WIND POWER PLANT

(75) Inventors: Yu Zhou, Singapore (SG); Eik Herbsleb, Odder (DK); Chris Spruce, Leatherhead (GB); Kelvin Hales, Surrey (GB)

(73) Assignee: Vestas Wind Systems A/S, Aarhus, N. (DK)

( * ) Notice: Subject to any disclaimer, the term of this patent is extended or adjusted under 35 U.S.C. 154(b) by 428 days.

(21) Appl. No.: 13/576,923

(22) PCT Filed: Feb. 2, 2011

(86) PCT No.: PCT/EP2011/051482
§ 371 (c)(1),
(2), (4) Date: Oct. 23, 2012

(87) PCT Pub. No.: WO2011/095519
PCT Pub. Date: Aug. 11, 2011

(65) Prior Publication Data
US 2013/0035798 A1 Feb. 7, 2013

(30) Foreign Application Priority Data
Feb. 5, 2010 (DK) ................................. 2010 00099

(51) Int. Cl.
*G06F 19/00* (2011.01)
*F03D 7/04* (2006.01)
(Continued)

(52) U.S. Cl.
CPC ................ *F03D 7/043* (2013.01); *F03D 1/003* (2013.01); *F03D 7/0292* (2013.01); *G06Q 10/04* (2013.01);
(Continued)

(58) Field of Classification Search
USPC ..................... 700/287; 703/5, 19, 2
See application file for complete search history.

(56) References Cited

U.S. PATENT DOCUMENTS 4,435,647 A * 3/1984 Harner et al. .................. 290/44
5,155,375 A 10/1992 Holley
(Continued)

FOREIGN PATENT DOCUMENTS

EP 1790851 A2 5/2007
EP 1911968 A1 4/2008
(Continued)

OTHER PUBLICATIONS

Search Report dated Sep. 14, 2010 for Danish Patent Application No. PA 2010 00099.
(Continued)

*Primary Examiner* — Kidest Bahta
(74) *Attorney, Agent, or Firm* — Patterson & Sheridan, LLP (57) ABSTRACT

Method of operating a wind power plant including the steps of: operating the wind power plant at an current parameter schedule ($P_{current}(v)$) performing a wind prediction of wind data ($V_w$) for a time frame ($\Delta T$) extending to a future time T, determining a desired fatigue load level ($F_{desired}$) of a wind power plant component at the future time T, and during operation of said wind power plant generating an updated parameter schedule ($P_{desired}(v)$) to provide the desired fatigue load level ($F_{desired}$) at time T if exposed to the predicted wind conditions ($V_w(t)$) during said time frame ($\Delta T$).

15 Claims, 6 Drawing Sheets

(51) Int. Cl.
*F03D 1/00* (2006.01)
*F03D 7/02* (2006.01)
*G06Q 10/04* (2012.01)
*G06Q 10/06* (2012.01)
*G06Q 50/06* (2012.01)

(52) U.S. Cl.
CPC ............... *G06Q 10/06* (2013.01); *G06Q 50/06* (2013.01); *F05B 2260/82* (2013.01); *F05B 2260/821* (2013.01); *F05B 2270/1095* (2013.01); *F05B 2270/20* (2013.01); *F05B 2270/32* (2013.01); *F05B 2270/321* (2013.01); *F05B 2270/332* (2013.01); *F05B 2270/404* (2013.01); *Y02E 10/723* (2013.01); *Y04S 10/54* (2013.01)

(56) References Cited

U.S. PATENT DOCUMENTS

| | | | | |
|---|---|---|---|---|
| 5,289,041 | A * | 2/1994 | Holley | 290/44 |
| 6,975,925 | B1 * | 12/2005 | Barnes et al. | 700/286 |
| 2003/0127862 | A1 | 7/2003 | Weitkamp | |
| 2007/0078791 | A1 | 4/2007 | Vyas et al. | |
| 2010/0131216 | A1 * | 5/2010 | Pedersen | 702/60 |
| 2010/0196153 | A1 * | 8/2010 | DeRuyter et al. | 415/208.1 |

FOREIGN PATENT DOCUMENTS

| | | |
|---|---|---|
| EP | 1930855 A2 | 6/2008 |
| EP | 2025929 A2 | 2/2009 |
| EP | 2110551 A1 | 10/2009 |
| EP | 2264314 A2 | 12/2010 |
| JP | 2008064081 A | 3/2008 |
| WO | 2008131775 A2 | 11/2008 |

OTHER PUBLICATIONS

International Search Report dated Oct. 20, 2011 for International Application PCT/EP2011/051482.

* cited by examiner

METHOD OF OPERATING A WIND POWER PLANT

FIELD OF INVENTION

The present invention relates to a method of operating a wind power plant. In particular the invention relates to a method for operating a wind power plant where the operation of the power plant is performed in relation to a wind prediction of wind data for a time frame extending to a future time is performed. The invention furthermore relates to a method of operation of a wind power plant making use of a set of sensors that senses operational data relating to the load on various components in the wind power plant. The operational data may be used to provide an estimation of an operational status of the wind power plant, in particular whether a fault condition is present or not for a component of the wind power plant.

BACKGROUND ART

The cost for production of energy in wind power plants accrues from initial investments in the plant and maintenance costs. Components included in the wind power plants are exposed to wear, resulting from load with a large variety during the operation of the power plant. This in particular applies to components that are subject to fluctuating or oscillating loads such as gearboxes and transmission elements. Fluctuating or oscillating loads are prone to result in fatigue of the components. In order to ensure that an initial investment in a wind power plant generates power at as low cost as possible it is a necessity to have a maintenance schedule for the plant, such that the operation of the wind power plant may be safeguarded. Current maintenance practice for wind farms consists of scheduled maintenance and unscheduled maintenance.

In order to improve the possibility of accurately scheduling maintenance turbine condition monitoring systems have been suggested. With the installation of a turbine condition monitoring system, early detection of the component failure is possible. An example of a system for monitoring gearbox components is described in EP1930855.

EP1930855 disclosures a gearbox life estimation system which will estimate the remaining life of the gearbox based on the operational load data measured through sensors. Individual load on components are calculated. From the individual loads an assessment of the remaining life as a real time estimate is obtainable. A maintenance schedule may be set using the information about the calculated remaining life. Even though the method described in EP1930855 improves the capability of deciding appropriate maintenance intervals, further improvements are desirable in order to further reduce the risk for component failure and to reduce the risk of a need for unscheduled maintenance.

Unscheduled maintenance usually happens when a component failure is detected and repair or replace actions have to be taken. The cost of unscheduled maintenance is one of the biggest contributors for the turbine operation and maintenance cost.

SUMMARY OF THE INVENTION

It is an object of the invention to reduce the need of unscheduled maintenance. This object is achieved by a method for operating a wind power plant according to claim 1. According to the invention, the method of operating a wind power plant includes the steps of operating the wind power plant at an current parameter schedule, performing a wind prediction of wind data for a time frame extending to a future time, determining a desired fatigue load level of a wind power plant component at the future time, and during operation of said wind power plant generating an updated parameter schedule to provide the desired fatigue load level at said future time if exposed to the predicted wind conditions during said time frame. Generally the time frame $\Delta T$ extends from a current time $t0$ to a future time $T$.

The parameter schedule includes values implementing desired operating characteristics of the wind power plant as a function of the wind velocity $v$, the values of an initial parameter schedule are chosen by the designer of the wind power plant and are dependent on the particulars of the actual wind power plant that is controlled. The parameter schedule may include series of values for a desired torque, rotor speed and pitch angle as a function of the wind velocity. Generally a parameter schedule is used to optimize wind power operation or production or cost of energy. The parameter schedule may thus represent a control scheme as described in the article "Reducing cost of energy by a self tuning controller" as disclosed in European Wind energy conference, 1-5 Mar. 1999, Nice, France, pp 873-876. Alternatively the parameter schedule may be represented by a power curve mapping a wind velocity to a desired output power. The desired output power is used to determine rotor speed and torque of the engine.

An initial parameter schedule may be set at initiation of the wind power plant. During operation the initial power curve will be updated. At any given time the wind power plant is operated based on a current parameter schedule. According to the invention an updated parameter schedule is generated during operation of the wind power plant to replace the current parameter schedule.

By generation of an updated parameter schedule the operator may influence the fatigue load level at said future time to be adapted to the predicted wind condition and result in that a desired fatigue load level at the future time can be obtained.

In EP1930855 it is stated that according to an embodiment described therein, the control system may be configured to shift the operating point in the power curve by controlling pitch angle of the turbine blades to mitigate load unbalances based on an output from the processor. The modified operating point in the power curve enables the generator to operate below the rated power, keeping in view the health of gearbox components, in order to optimize the working of the generator based on life of the gearbox components.

Figure 1:
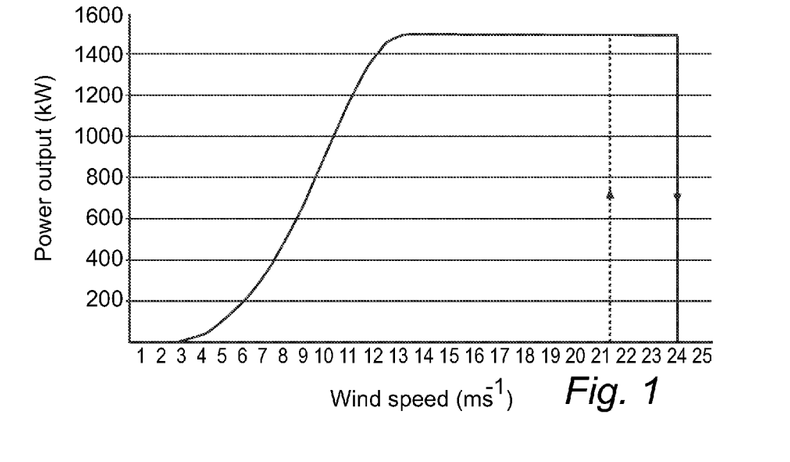
FIG. 1 shows a diagram of a parameter schedule for optimal power production.

A conventional power curve for wind turbine control system as disclosed in EP1930855 is design to achieve optimal power efficiency with Cp at the peak so that maximum power output is achieved at different wind speed. A conventional power curve is frequently referred to as rated power. With rated power is intended a power curve resulting in maximum output power. An actual turbine operating point is dependent on the wind speed. When the wind speed is below rated wind speed, the turbine is controlled to obtain maximum power output. When the wind speed reaches rated wind speed or becomes even higher, the maximum power output will be limited and some of the available energy in the wind will be wasted. The turbine will shut down when the wind speed reaches furling wind speed. An updated power curve in accordance with the invention will result in that an operating point is shifted and that—the turbine maximum power output is limited to a lower than rated power level. The power output from generator can be expressed as: $P_g = \eta_g \omega_g T_g$, where $\eta_g$ is the efficiency, $\omega_g$ is the rotational frequency and $T_g$ is the torque. The reduction of $P_g$ could be implemented by reduction of generator rpm and/or generator torque depending on the detail design of the turbine control system. FIG. 1 shows a typical power curve of 1.5 MW wind turbine.

Load unbalance migration mentioned in the EP1930855 through reduction of maximum power output does not replace or amend the power curve and is only effective when the wind speed is higher than a corresponding wind speed threshold in the power curve where operation of the wind turbine is performed at reduced power. When wind speed is below the wind speed threshold there is no change of the load.

Specifically a de-rated parameter schedule may be used by the turbine control system to operate turbine in such a way that the turbine may continue produce power to a point in time where optimal maintenance is achieved. This has a fundamental impact on the cost per produced kilowatt. That is, by adapting the parameter schedule to result in a desired fatigue load level at a future time, it is possible to run the turbine to slow down the failure propagation rate in consideration of a predicted wind condition. It may furthermore be possible to adapt the parameter schedule to requirements of maintenance scheduling, power production and cost.

Usually, the turbine components have desired designed lifetime $N_{eq}$ (cycles to fatigue) under the equivalent fatigue load $F_{eq}$ based on the component material and structure. The contribution to the fatigue load level at a certain wind condition for a component can be derived from a model established between the load on the component and the wind data. The model will be built based on the historical data. Examples of loads that can be modeled are blade flip load and drive train torque. The load for the predicted wind data can be then calculated based on this model. The model can be established based on the historical data using regression models. Below is an example of typical model which is used for such relationship building.

$$L_i(\theta) = a_0 + a_1 X_{1i} + a_2 X_{2i} + \ldots + a_p X_{pi} + b_1 X_{1i}^2 + b_2 X_{2i}^2 + \ldots + b_p X_{pi}^2 + \ldots \qquad \text{Equation 1}$$

Here Li refers to the load calculated at time i at inflow angle $\theta$. $a_1, a_2, \ldots, a_p, b_1, b_2, \ldots, b_p$ are the coefficients that are decided through. $X_{1i}, X_{2i}, \ldots, X_{pi}$ are the variables that will affect the turbine component loading. They are usually wind speed, wind direction, wind speed std (standard deviation), or combination of them, for example wind speed/wind speed std. Detail models for different turbine components and/or load, the order of the equation and the number of variables/parameters used could be different.

An integration or summation of the load of the component over the time up till the end of the prediction interval over the load of the component as a function of the wind distribution thus results in a fatigue load level of the component at the end of the prediction interval.

A desired fatigue load level $F_{desired}$ at the future time T may be determined with respect to a maintenance schedule M A maintenance schedule M may contain information about planned future maintenance events. In particular the maintenance schedule may contain information about a next time to perform a maintenance and what actions should be taken at the next maintenance event. The maintenance optimization will decide the desired fatigue load level $F_{desired}$ for the specified component. With the input of wind speed prediction, the parameter schedule control system will calculate the wind turbine control new power reference $P_{desired}$, pitch angle reference $\beta_{ref}$ and the generator speed reference $\omega_{ref}$. The desired power reference/power curve is calculated based on the desired fatigue load level $F_{desired}$ and predicted wind data $V_w$ and it can be generally expressed as $P_{desired} = H(V_w, F_{desired})$.

The new power reference $P_{Desired}$ corresponds to an updated power curve $P_{desired}(v)$ that results in a desired fatigue load level $F_{desired}$ when exposed to a predicted wind condition $V_w(t)$.

In particular the present parameter schedule may be used to determine a predicted fatigue load level $F_{predicted}$ at an end of a prediction interval, which end corresponds to the future time mentioned above. The predicted fatigue load level $F_{predicted}$ is determined from a predicted wind data $V_w$. The predicted wind data $V_w$ includes information of wind velocities and wind directions and optionally also information concerning wind speed fluctuations and turbulence. The wind data $V_w$ may be represented as a distribution of wind velocities and directions during the prediction interval. A mapping between wind condition and load on a component may be used when determining the predicted fatigue load level $F_{predicted}$ on the component at the future time. The mapping may be derived, as has been explained above, from a model describing dynamics of the wind power plant having the wind condition and a present parameter schedule as an input.

In a maintenance optimization determination function the desired time interval TD that is needed before maintenance in order to achieve minimal operation and maintenance cost with consideration of wind speed condition in the coming months may be calculated. Based on this desired time interval TD, a desired fatigue load level $F_{desired}$ at an end point of the desired time interval on the corresponding component is derived based on a component fatigue lifetime calculation. This desired fatigue load level $F_{desired}$ at the end point of the desired time interval is used as an input for calculation of a desired updated parameter schedule $P_{desired}(v)$. For different components different failure modes may exist. Each failure mode for each component may have a specific failure propagation rate depending on the load of the component. Hence, the relationship between the residual lifetime and the fatigue load on the component is different for each component and failure mode. A database of relationships describing the failure propagation rate as a function of the load with different failure modes of different components in wind turbine is needed in the form of formula or in the form of fatigue load limit and residual life cycle table. The database can be built based on design calculation and simulation. It can also be built based on the historical data.

In the parameter schedule control system, a corresponding pitch angle $\beta_{ref}$ and the target generator speed $\omega_{ref}$ will be calculated based on the desired fatigue load level $F_{desired}$. Finally, the desired power reference and powercurve may be then calculated with the expression as $P = H(V_w, L_{desired}) = C \cdot F(\beta_{ref}(L_{desired}), \omega_{ref}(L_{desired})/V_w)$. Where C is a coefficients that is related to the size of wind turbine, and the transmission gain from the rotor to the generator. The F(.) function is mainly dependent on the design of the blade.

Based on a selected maintenance action, the estimated remaining lifetime with the specified inflow angle may be chosen to match the expected lifetime, and corresponding inflow angle may be used to calculate the $C_p$ value and thus the updated parameter schedule $P_{desired}(v)$ for the WTG control.

One way of generating an updated parameter schedule $P_{desired}(v)$ adapted to generate a desired fatigue load level at a future time T is to calculate a predicted fatigue load level $F_{predicted}$ at the future time T when exposed to the predicted wind conditions $V_w(t)$ during the time frame $\Delta T$, to compare the predicted fatigue load level $F_{predicted}$ with the desired fatigue load level $F_{desired}$ at future time T and to generate the updated parameter schedule $P_{desired}(v)$ based on this difference.

The initial maximum power production parameter schedule $P_{max}(v)$ is a function of the wind velocity. The updated parameter schedule may be expressed as $P_{desired}(v) = w(v) P_{max}(v)$, where w is a weight function that may be dependent on the wind velocity and desired fatigue load level $F_{desired}$. The desired fatigue load level $F_{desired}$ at an end of a prediction interval is determined from the integration over time and wind velocity over a mapping from a predicted wind distribution via a parameter schedule to a load on a component.

By selecting an appropriate weight function a desired fatigue load level $F_{desired}$ may be achieved at the end of the prediction interval. No unique solution to the weight function exists. It may be selected to be a constant whereby the desired updated parameter schedule $P_{desired}(v)$ is a fixed proportion of an initial parameter schedule, that is $w(v)=k$. It may also be selected to suppress the power at high wind velocities more than at low wind velocities. An example of such a function would be $w(v)=k1+k2/v$. It may also be selected to suppress power at wind speeds that are more frequent more than wind speeds that are not predicted to be frequent.

By adapting the weight function to the difference between predicted and desired fatigue load levels at the future time T, it is possible to generate an updated parameter schedule $P_{desired}(v)$ that generates a desired fatigue load level $F_{desired}$ of a wind turbine component when exposed to a predicted wind condition $V_w(t)$ during a time frame $\Delta T$.

The predicted fatigue load level $F_{predicted}$ corresponds to a residual lifetime R at said future time T when exposed to the predicted wind conditions with use of the current not updated parameter schedule $P_{current}(v)$. The residual life is a measure of how long a component is assumed to be operable before fatigue. The updated parameter schedule $P_{desired}(v)$ may be a function of a difference between said residual lifetime R and a time TM for a next maintenance event in a maintenance schedule.

In addition to adapting the updated parameter schedule $P_{desired}(v)$ to provide a desired fatigue load level $F_{desired}$ at the end of a prediction interval, the magnitude of the calculated fatigue load level at the end of the prediction interval may be used to determine timing of a next maintenance event. In this embodiment of the invention a cost function for updated parameter schedules is calculated.

Generally the cost for a parameter schedule amount to the loss of generated power due to derated power profile. In the event a weight function is a constant k between 0 and 1, the proportion of loss in produced energy amounts to 1-k. The cost for maintenance according to various maintenance models including continued operation of the wind power plant at maximum output power, replacement of component before component failure at a time t, replacement of component at failure or derating of output power to delay failure propagation sufficiently to prevent failure before a next planned maintenance. The cost for derating output power is compared with the cost for different maintenance models. An optimal parameter schedule with respect to the cost is then selected as the updated parameter schedule $P_{desired}(v)$.

Optionally operational data of a wind turbine component may thus be sensed from which operational data a failure mode of a component may be determined. The sensed operational data can be performed by sensors measuring load on the components such as accelerometers or torque sensors, and turbine speed, wind speed and direction. According to the invention, the fatigue load on the components are calculated and predicted based on the regression model which can be built based on the historical operational date. The model will adaptively be modified and adjusted with time using the sensed operational data. The residual lifetime R of a component can be estimated when an early failure of a component is detected.

Further input can be given about the vibration level detected at the component through a component condition monitoring system. The vibration level of the component is used as an instant feedback to check whether the component load is de-rated by the updated parameter schedule or not. A lower vibration level as compared to the vibration level before de-rating should be observed when the updated parameter schedule $P_{desired}(v)$ is implemented.

Optionally a desired time interval TD that is needed before maintenance of the power plant is calculated, which desired time interval TD optimizes operation and maintenance cost with consideration of predicted wind data $V_w$.

The fatigue load level thus determined may be compared with the desired fatigue load level $F_{desired}$. A difference between the desired fatigue load level $F_{desired}$ and the determined fatigue load level may be used as an input to determine a desired updated parameter schedule $P_{desired}(v)$ which would result at that the desired fatigue load level $F_{desired}$ may be reached.

Hence, in an embodiment of the invention first a calculation of a predicted fatigue load level $F_{predicted}$ based on a current parameter schedule $P_{current}(v)$ may take place, then a desired fatigue load level $F_{desired}$ may be determined for said future time.

Initially a parameter schedule based on maximum power production will be used. This parameter schedule sets the limits for the maximum power level defined for each wind velocity. The desired updated parameter schedule will thus be adapted to give a lower power output than the initial parameter schedule.

Operational data of the wind power plant component may be sensed and presence of a fault condition may be based on said operational data. The steps of initiating calculating of a predicted fatigue load level $F_{predicted}$ and generating an updated parameter schedule adapted may be performed first after a fault condition for a wind power component has been detected.

Assessing of a fatigue load level or a residual lifetime of said wind turbine component based on said operational data upon early detection of component failure may be performed as a basis for the generation of an updated parameter schedule.

The fatigue load level of a component may be used to estimate the actual cycle number to fatigue of the component. Upon detection of the component failure, the component remaining lifetime, that is the residual lifetime, can be estimated based on the wind condition prediction at different pitch angle and shear.

BRIEF DESCRIPTION OF DRAWINGS

Embodiments of the invention will be described below with references to appended drawings where.

DETAILED DESCRIPTION

Figure 2:
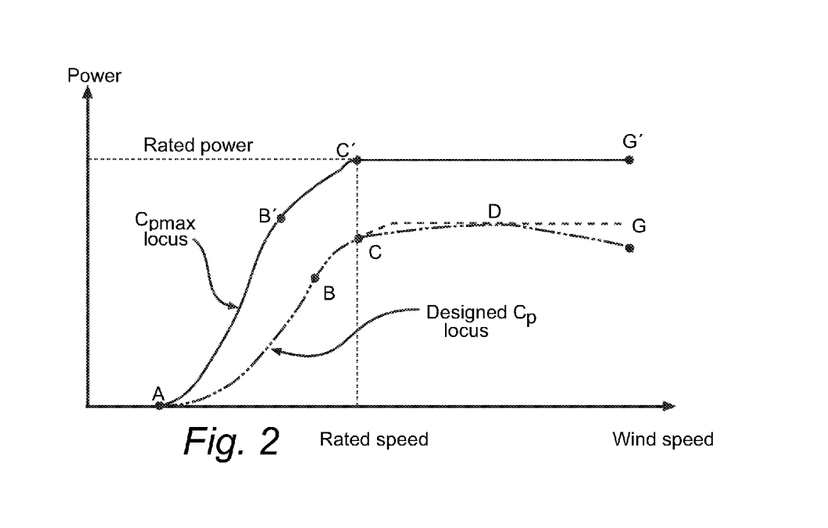
FIG. 2 shows a diagram of a parameter schedule for optimal power production and an updated parameter schedule based on a determined predicted residual lifetime and/or predicted fatigue load, FIG. 3 describes a block diagram of a first embodiment of a power management system for a wind power plant, FIG. 4 describes a block diagram of a second embodiment of a power management system for a wind power plant.

FIG. 2 shows an example of a parameter schedule for variable speed variable pitch turbine control. The figure shows an upper parameter schedule based on maximal power production and a lower updated parameter schedule adapted to a predicted fatigue load of a component.

From point A to B, the power curve can be simply described as, $$P = \frac{1}{2}\rho\pi R^2 C_p(\lambda, \beta) V^3$$

Here the power coefficient $C_p$ is a function of $\lambda$ and $\beta$. According to the invention the power coefficient $C_p$ will not follow the $C_{pmax}$ locus for max turbine power output when de-rating is required. The power coefficient $C_p$ will be calculated based on the values of the coefficients $\lambda$ and $\beta$, which are determined from a desired fatigue load level $F_{desired}$ at a future time T. $\lambda$ is the tip-speed ratio of the blade. $\beta$ is the pitch position of blades, i.e. rotation around a longitudinal axis of the blade. The load of the component in wind turbine, such as for example a blade, is dependent on $\lambda$ and $\beta$. By changing the value of $\lambda$ and $\beta$ based on the desired fatigue load level $F_{desired}$, an updated power curve $P_{desired}(v)$ is obtained from the power coefficient. The updated power curve $P_{desired}(v)$ may be set to be valid for a time window to next maintenance and may be determined from various fatigue load assessments on different components, where an optimal updated power curve $P_{desired}(v)$ for a complete set of components with respect to maintenance cost may be selected.

From point B' to C', the rotational speed gets close to its upper limit, the rotational speed is regulated at this value as wind increases to rated wind speed, which is the wind speed at which the maximum power production is initiated for the original power curve. For the updated power curve $P_{desired}(v)$, similarly, the rotational speed gets close to the new defined upper limit, and the rotational speed is regulated according to the wind speed similarly.

From point C to G, the power output is controlled to the new limited power where $C_p$ may decrease with the increase of the wind speed. The detail design of power curve from C to D could be different for different control strategies. A main object of the invention is that the power is controlled in dependence of an estimated future fatigue load level.

Figure 3:
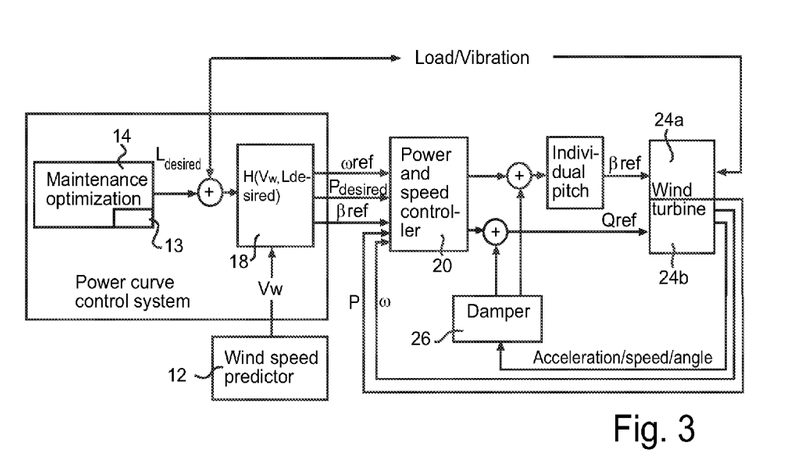

FIG. 3 describes a block diagram of a first embodiment of a power management system 10 for a wind power plant. In the first embodiment, information from a maintenance optimization control block generates the necessary information for updating a power curve. In a wind prediction control block 12 a wind prediction of wind data $V_w$ for a time frame $\Delta T$ extending to a future time T is performed. Wind prediction can be provided from meteorological services as well as from on site calculations. The calculations may be performed by a wind-atlas method as introduced by Troen, I. and Lundtang Petersen, E. (1989) European Wind Atlas, Risø National Laboratory, or by a numerical wind atlas method specifically adapted for the site.

In the wind prediction control block 12 prediction of wind data $V_w$ including wind speed and wind direction during a prediction interval is performed. The predicted wind data $V_w$ defines a predicted wind condition $V_w(t)$ and includes information of wind velocities and wind directions and optionally also information concerning wind speed fluctuations and turbulence. The wind data $V_w$ may be represented as a distribution of wind velocities and directions during the prediction interval. The wind prediction is based on a meteorological forecast and has a prediction interval extending for a substantial time. The prediction interval extends at least a number of days, suitably one or more weeks and optionally for a month or more.

The prediction interval preferably extends to a time for a future maintenance event. For this reason the wind prediction control block may receive indata from a maintenance optimization control block 14, where a scheduling of maintenance events can be determined based on the operation of the wind power plant and on the predicted wind condition $V_w(t)$.

A desired fatigue load level calculation control block 13 is provided where a desired fatigue load level $F_{Desired}$ at future time T is determined. The desired fatigue load level $F_{desired}$ at the future time T may be determined with respect to a maintenance schedule. The desired fatigue load level calculation control block 13 may therefore be a part of the maintenance optimization control block 14. Optionally a desired time interval TD that is needed before maintenance of the power plant is calculated, which desired time interval TD optimizes operation and maintenance cost with consideration of predicted wind data $V_w$. The maintenance optimization may thus calculate the desired time interval TD that is needed before maintenance in order to achieve minimal operation and maintenance cost with consideration of wind speed condition in the coming months.

The desired fatigue load level $F_{Desired}$ can be calculated based on information relating to fatigue and load on the components. Such calculations are well known in the art and may for instance be based on the calculations and graphs described in relation to FIG. 7. Based on this desired time interval TD, the desired fatigue load level $F_{desired}$ on the corresponding component is derived based on a component fatigue lifetime calculation. The desired fatigue load level $F_{desired}$ is used as an input for calculation of a desired updated parameter schedule $P_{desired}(v)$. Since for different failure modes for different components, the relationship between the residual lifetime and the fatigue load is different, a database of such relationships for different failure modes of different components in wind turbine is needed in the form of formula or in the form of fatigue load limit and residual life cycle table. This relationship can be built based on design calculation and simulation. It can also be built based on the historical data.

The calculated desired fatigue load level $F_{Desired}$ serves as an input to the parameter schedule calculation control block 18. In the parameter schedule calculation control block 18, an updated parameter schedule $P_{desired}(v)$ is generated. The updated parameter schedule $P_{desired}(v)$ is a function of the desired fatigue load level $F_{Desired}$. The desired fatigue load level $F_{Desired}$ may be determined with respect to the desired time before maintenance calculated in the maintenance optimization control block 14 for each specified component. In addition information about the predicted wind condition $V_w(t)$ is collected from the wind prediction control block 12 to serve as a basis for the calculation of an updated parameter schedule $P_{desired}(v)$.

The desired fatigue load level $F_{desired}$ can be decided based on the time to the catastrophe failure or scheduled maintenance during low wind season. This time will be decided based on the algorithm for optimal maintenance, which will calculate the best time for scheduled maintenance based on the cost of visit, cost of affected components, wind condition, turbine power production and so on. The updated parameter schedule $P_{desired}(v)$ will reduce the load on the early defected failure turbine components like gearbox, turbine rotor etc. This will help to reduce the failure propagation rate, and thus delay the catastrophe turbine component failure to a period where wind speed is low and thereby coinciding with the best time for turbine maintenance.

With the input of wind speed prediction, the curve calculation control block 18 will calculate a wind turbine control new power reference $P_{desired}$, pitch angle reference $\beta_{ref}$ and the generator speed reference $\omega_{ref}$. The desired power reference is calculated based on the desired fatigue load level $F_{desired}$ and the wind data $V_w$ and it can be generally expressed as $P_{desired} = H(V_w, F_{desired})$.

As has been explained above a new power reference $P_{Desired}$ corresponds to a an updated parameter schedule $P_{desired}(v)$ that results in a desired fatigue load level $F_{desired}$ when exposed to a predicted wind condition $V_w(t)$.

Based on the updated parameter schedule $P_{desired}(v)$ a power and speed controller 20 for a wind power plant is provided with control signals in the form of generator speed reference $\omega_{ref}$, the updated power reference $P_{Desired}$, and the pitch angle reference $\beta_{ref}$.

The power and speed controller 20 feeds forward information to an individual pitch controller 22 generating individual pitch set point for respective blade. T The individual pitch angle is feed to actuators 24a in the wind power plant which controls the pitch of the blades. The power and speed controller furthermore controls the rotational speed of the rotor in a conventional manner by feeding control signals to rotational speed controllers 24b in the wind power plant.

Acceleration, rotational speed and rotational position signals may be fed back via a damper 26 in a conventional manner for control of the wind turbine.

Figure 4:
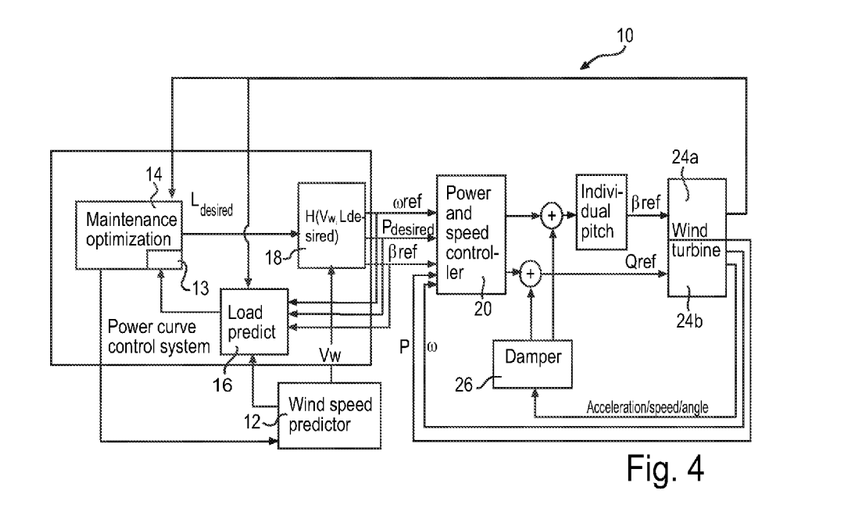

FIG. 4 describes a block diagram of a second embodiment of a power management system 10 for a wind power plant. In the second embodiment of the invention information from the wind prediction control block serves as basis for a calculation of a predicted fatigue load level $F_{predicted}$ at the future time T, which fatigue load level is a basis for the calculation of an updated parameter schedule $P_{desired}(v)$ based on a difference between the predicted fatigue load level $F_{predicted}$ and a desired fatigue load level $F_{desired}$ at the future time T.

In a wind prediction control block 12 a wind prediction of wind data $V_w$ for a time frame $\Delta T$ extending to a future time T is performed. Wind prediction can be provided from meteorological services as well as from on site calculations. The calculations may be performed by a wind-atlas method as introduced by Troen, I. and Lundtang Petersen, E. (1989) European Wind Atlas, Risø National Laboratory, or by a numerical wind atlas method specifically adapted for the site.

In the wind prediction control block 12 calculation of wind data $v_w$ including wind speed and wind direction for a prediction interval is performed. The predicted wind data $V_W$ includes information of wind velocities and wind directions and optionally also information concerning wind speed fluctuations and turbulence. The wind data $V_w$ may be represented as a distribution of wind velocities and directions during the prediction interval.

The prediction interval preferably extends to a time for a future maintenance event. For this reason the wind prediction control block may receive indata from a maintenance optimization control block 14, where a scheduling of maintenance events can be determined based on the operation of the wind power plant and on the predicted wind condition.

In a fatigue load level prediction control block 16 the predicted fatigue load level $F_{predicted}$ of a wind power plant component at a future time T is calculated based on the wind prediction and a present parameter schedule.

A mapping between wind condition and load on a component may be used when determining the fatigue load level on the component at the future time. The mapping may be derived from a model describing dynamics of the wind power plant having the wind condition and a present parameter schedule as an input.

Usually, the turbine components have desired designed lifetime $N_{eq}$ (cycles to fatigue) under the equivalent fatigue load $F_{eq}$ based on the component material and structure. The contribution to the fatigue load level at a certain wind condition for a component can be derived from a model established between the load on turbine and the wind data $V_w$ for a given parameter schedule. The model will be built based on the historical data. Example of loads that can be modeled are blade flip load and drive train torque. The load for the predicted wind data $V_w$ can be then calculated based on this model. The model can be established based on the historical data using regression models. Below is an example of typical model which is used for such relationship building.

$$L_i(\theta) = a_0 + a_1 X_{1i} + a_2 X_{2i} + \ldots + a_p X_{pi} + b_1 X_{1i}^2 + b_2 X_{2i}^2 + \ldots + b_p X_{pi}^2 + \ldots$$

Where Li refers to the load calculated at time i at inflow angle $\theta$. $a_1, a_2, \ldots, a_p, b_1, b_2, \ldots, b_p$ are the coefficients that are decided through. $X_{1i}, X_{2i}, \ldots, X_{pi}$ are the variables that will affect the turbine component loading. They are usually wind speed, wind direction, wind speed std (standard deviation), or combination of them, for example wind speed/wind speed std. Detail models for different turbine components and/or load, the order of the equation and the number of variables/parameters used could be different.

An integration or summation over the time up till the end of the prediction interval over the load of the component as a function of the wind distribution thus results in a fatigue load level of the component at the end of the prediction interval.

Hence the predicted fatigue load level $F_{predicted}$ for a component i can be expressed as:

$$F_{predicted} = \iint L_i(P) dW dt,$$

Where L is the load on the component i for a given parameter schedule P and the integral is over the complete wind distribution W with respect to wind velocity and direction and t is the time each condition is present.

The present parameter schedule $P_{Present}$ is collected from a parameter schedule calculation control block 18. The present parameter schedule delivered from the parameter schedule calculation control block 18 is used to determine fatigue load level at an end of a prediction interval, which end corresponds to the future time mentioned above.

$$F_{predicted} = \iint L_i(P_{Present}) dW dt,$$

A desired fatigue load level calculation control block 13 is provided where a desired fatigue load level $F_{Desired}$ at future time T is determined. The desired fatigue load level $F_{desired}$ at the future time T may be determined with respect to a maintenance schedule. The desired fatigue load level calculation control block 13 may therefore be a part of the maintenance optimization control block 12. Optionally a desired time interval TD that is needed before maintenance of the power plant is calculated, which desired time interval TD optimizes operation and maintenance cost with consideration of predicted wind data $V_w$. The maintenance optimization may thus calculate the desired time interval TD that is needed before maintenance in order to achieve minimal operation and maintenance cost with consideration of wind speed condition in the coming months.

The desired fatigue load level $F_{Desired}$ can be calculated based on information relating to fatigue and load on the components. Such calculations are well known in the art and may for instance be based on the calculations and graphs described in relation to FIG. 7. Based on this desired time interval TD, the desired fatigue load level $F_{desired}$ on the corresponding component is derived based on a component fatigue lifetime calculation. The desired fatigue load level $F_{desired}$ is used as an input for desired parameter schedule calculation. Since different failure modes exist for different components, and the relationship between the residual lifetime R and the fatigue load is different for different failure modes and components, a database of such relationships for different failure modes of different components in wind turbine is needed in the form of formula or in the form of fatigue load limit and residual life cycle table. This relationship can be built based on design calculation and simulation. It can also be built based on the historical data.

The calculated desired fatigue load level $F_{Desired}$ serves as an input to the parameter schedule calculation control block 18. In the parameter schedule calculation control block 18, an updated parameter schedule $P_{desired}(v)$ is generated. The updated parameter schedule $P_{desired}(v)$ is a function of the desired fatigue load level $F_{Desired}$. The maintenance optimization may decide the desired fatigue load level $F_{Desired}$ for each specified component.

The desired fatigue load level $F_{desired}$ can be decided based on the time to the catastrophe failure or scheduled maintenance during low wind season. This time will be decided based on the algorithm for optimal maintenance, which will calculate the best time for scheduled maintenance based on the cost of visit, cost of affected components, wind condition, turbine power production and so on. The updated parameter schedule $P_{desired}(v)$ will reduce the load on the early defected failure turbine components like gearbox, turbine rotor etc. This will help to reduce the failure propagation rate, thus delayed the catastrophe turbine component failure to the period where wind speed is low and also the best time for turbine maintenance.

With the input of wind speed prediction, the curve calculation control block 18 will calculate a wind turbine control new power reference $P_{desired}$, pitch angle reference $\beta_{ref}$ and the generator speed reference $\omega_{ref}$. The desired power reference is calculated based on the desired fatigue load level $F_{desired}$ and the wind data $V_w$ and it can be generally expressed as $P_{desired}=H(V_w, F_{desired})$.

As has been explained above a new power reference $P_{Desired}$ corresponds to a new parameter schedule $P_{desired}(v)$ that results in a desired fatigue load level $F_{desired}$ when exposed to a predicted wind condition $V_w(t)$.

Based on the updated parameter schedule $P_{desired}(v)$ a power and speed controller 20 for a wind power plant is provided with control signals in the form of generator speed reference $\omega_{ref}$, the updated power reference $P_{Desired}$, and the pitch angle reference $\beta_{ref}$.

The power and speed controller 20 feeds forward information to an individual pitch controller 22 generating individual pitch set point for respective blade. T The individual pitch angle is feed to actuators 24a in the wind power plant which controls the pitch of the blades. The power and speed controller furthermore controls the rotational speed of the rotor in a conventional manner by feeding control signals to rotational speed controllers 24b in the wind power plant.

Acceleration, rotational speed and rotational position signals may be fed back via a damper 26 in a conventional manner for control of the wind turbine.

Figure 5A:
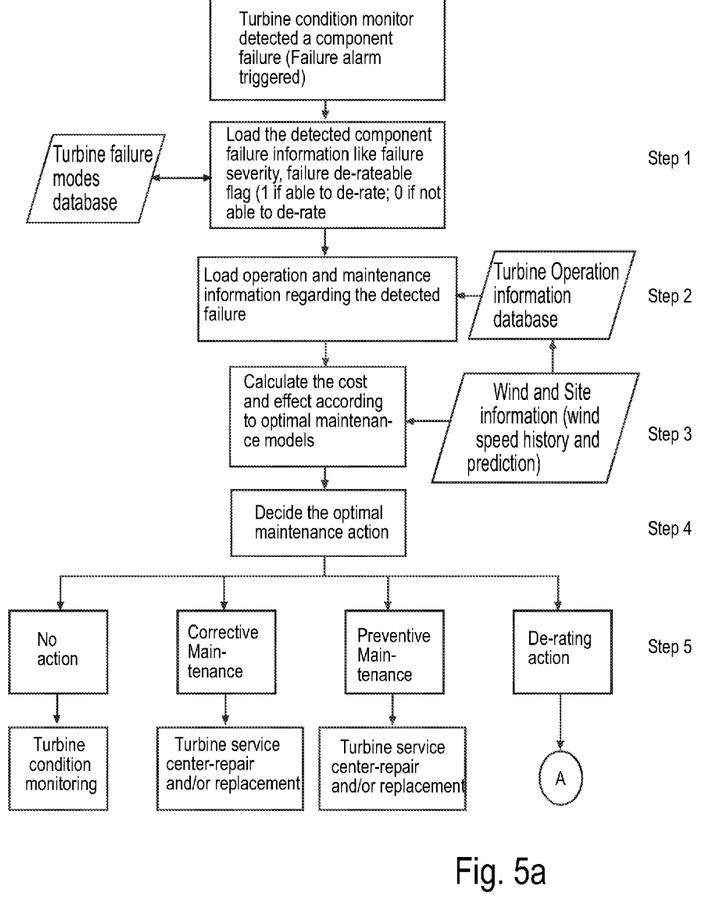
FIG. 5a shows a flow chart for optimal maintenance control is presented.
Figure 5B:
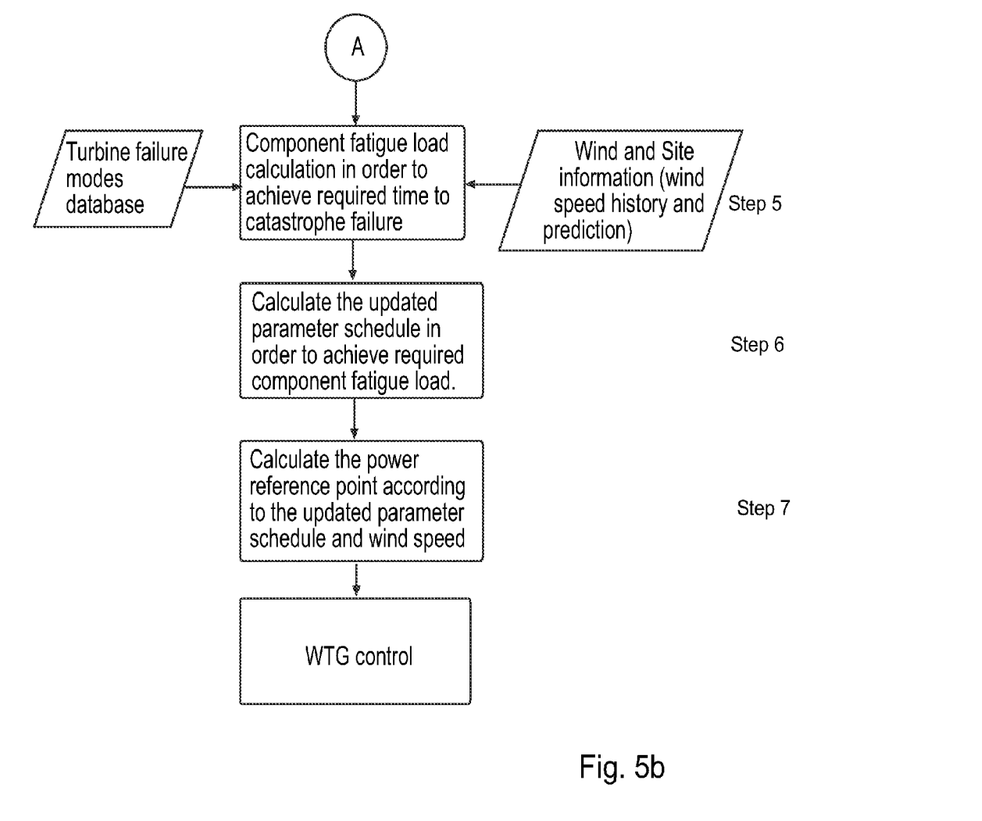
FIG. 5b shows a flow chart for derating of a parameter schedule in an optimal maintenance control method as described in relation to FIG. 5a, FIG. 6 describes one possible implementation structure of the system for the parameter schedule control for optimal maintenance action.

In FIGS. 5a and 5b a flow chart for optimal maintenance control is presented. FIG. 5a describes the general chart and FIG. 5b describes the steps to be taken in the event a maintenance mode including derating of the parameter schedule is selected.

When an early failure mode of turbine critical component is detected the following method steps may be performed:

Step 1. The system will get the information of the detected failure from the turbine failure mode database and decided whether the detected component failure mode is able to achieve remaining lifetime extension if the fatigue load acting on the component is reduced. The de-rating flag will be set to 1 is the failure mode is de-ratable and set to 0 is not.

Step 2. In a subsequent step the operation and maintenance information regarding a detected failure is retrieved.

Step 3. The operation costs and revenue lost according to the various maintenance actions/plans is calculated.

Step 4. The optimal maintenance process will then plan the possible maintenance actions/plans based on the predicted weather conditions. The best maintenance actions/plans based on the min cost of operation and maintenance will be decided.

Step 5. Corresponding parts/materials ordering, resource arrangement etc. will be planned according to the maintenance action made. The fifth step includes four different maintenance modes:

A) Whether no action is to be taken, that is that the turbine should be controlled according to the current operating parameter schedule and that the current maintenance an service schedule should not be amended.

B) Whether preventive maintenance should be performed. Preventive maintenance is constituted by replacing a component before fatigue.

C) Whether corrective maintenance should be performed. Corrective maintenance is constituted by replacing a component at the time for fatigue. That is the fatigue load must be monitored and the maintenance schedule should be adapted to a deemed or detected time for failure.

D) Whether a derating of the parameter schedule should take place in order to adapt a time for fatigue to a scheduled maintenance.

In FIG. 5b the steps 5-7 taken in the event a derating of the parameter schedule is performed:

Step 5. For the decision of the de-rating action, the proposed system will proceed to the parameter schedule control system, which will calculate the component desired fatigue load level $F_{desired}$ for the corresponding component extended remaining life time in order to achieve the optimal maintenance action. The fatigue load calculated would be in the form of $F(\omega_w)$ where $\omega_w$ is the wind speed.

Step 6. The updated turbine parameter schedule $P_{desired}(v)$ will then be calculated based on the desired fatigue load level $F_{desired}$ on the detected failure component according to the WTG control system design.

Step 7. The WTG controller will control the controller pitching and generator power output at different wind speed according to the updated defined parameter schedule $P_{desired}(v)$ for the WTG controller. Thus the target fatigue load on the component is achieved.

The turbine condition monitoring system will continue the component failure signature severity and feedback to the system.

The optimal maintenance system will adaptively take corresponding corrective or preventive maintenance action based on turbine health condition, and the weather condition.

The whole system may be provided as a close loop system that will closely monitor the critical components health condition and adaptively taking corresponding optimal maintenance action to control the WTG parameter schedule so that the required de-rating on the detected failure components with target fatigue load is achieved.

Figure 6:
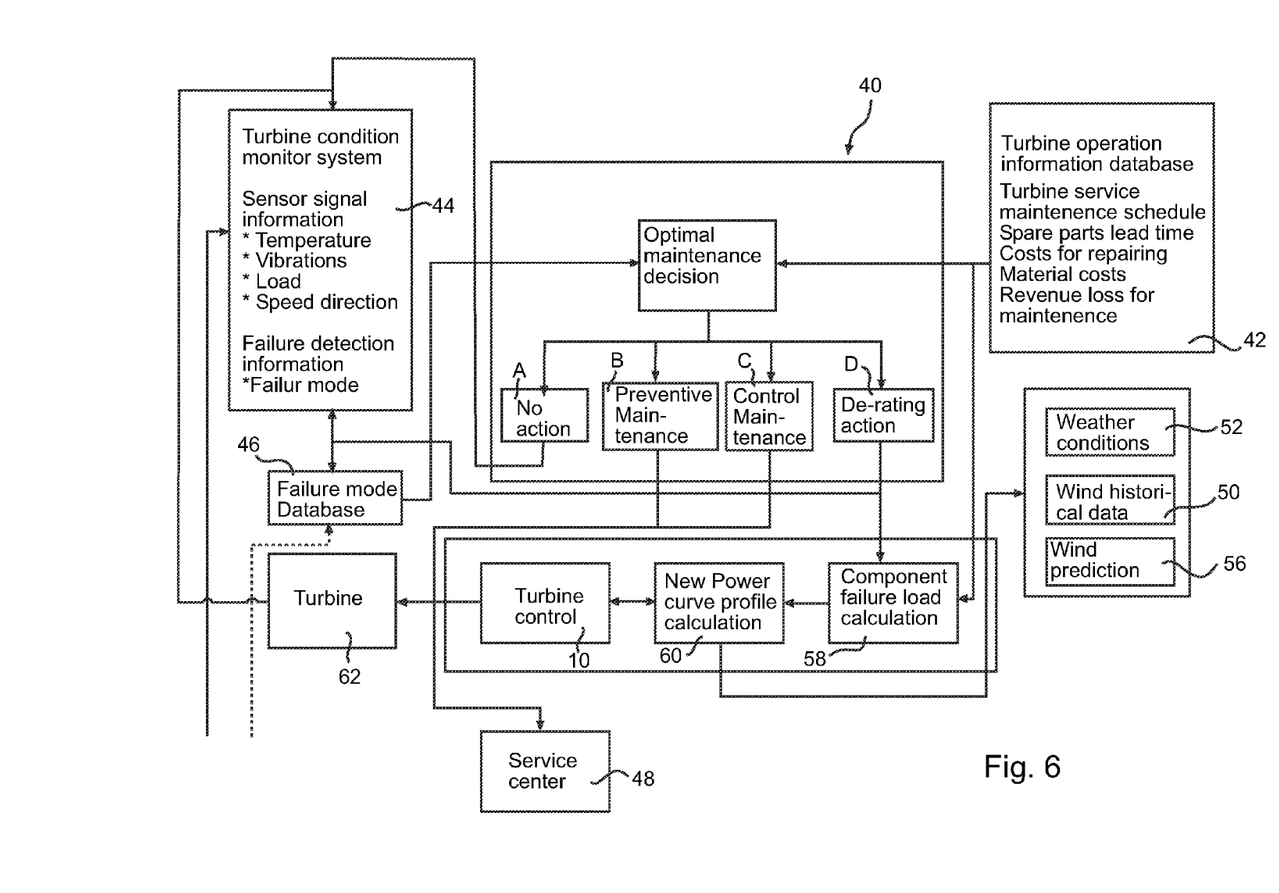

FIG. 6 describes one possible implementation structure of the system for the parameter schedule control for optimal maintenance action. The system includes an optimal maintenance decision control block 40 which based on information from a turbine operation information database 42 and a turbine condition monitor system 44 determines a maintenance strategy for the wind power plant. The turbine operation information database 42 includes information about a turbine service and maintenance schedule, lead time of spare part delivery, cost for repairing material costs, revenue loss for maintenance and production interruptions. The turbine condition monitor system 44 includes a set of sensors providing information about operational data $\psi$ such as temperature, vibrations, load, wind speed and direction of wind. The turbine condition monitor system 44 further includes a failure detection control block providing information about failure modes of components from a failure mode database 46. Based on the information provided from the turbine operation information database 42 and the turbine condition monitor system 44, the optimal maintenance decision control block 40 determines which action is to be taken. The optimal maintenance decision control block 40 differ between the following four operational modes:

A) Whether no action is to be taken, that is that the turbine should be controlled according to the current operating maintenance schedule and that the current maintenance an service schedule should not be amended.
B) Whether preventive maintenance should be performed. Preventive maintenance is constituted by replacing a component before fatigue.
C) Whether corrective maintenance should be performed. Corrective maintenance is constituted by replacing a component at the time for fatigue. That is the fatigue load must be monitored and the maintenance schedule should be adapted to a deemed or detected time for failure.
D) Whether a derating of the parameter schedule should take place in order to adapt a time for fatigue to a scheduled maintenance.

Information from the mode control blocks B and C are provided to a service centre 48, where information about maintenance intervals and maintenance schedules is stored. The service centre 48 is connected to the turbine operation information database 42, the turbine condition monitor system 44 and the failure mode database 46 for updating relevant information about the status of the components of the turbine.

A wind condition monitoring control block 50 includes a current wind condition control block 52 that monitors information about the current wind conditions including wind speed, fluctuations in wind speed and wind direction. The current wind condition control block 52 retrieves its information from a set of sensors, which may be the set of sensors included in the turbine condition monitor system 44 or sensors located elsewhere. The current wind condition control block 52 may also retrieve information from a meteorological database. The weather monitoring control block further has a historical wind data base 54 form where the wind condition in past time may be retrieved. A wind prediction control block 56 is also provided. The wind prediction control block 56 may retrieve information from a meteorological data base or rely on information from the historical wind condition database 54, possibly with adjustments depending on the current weather condition. Information from the weather monitoring control block 50 concerning a predicted weather condition is forwarded to a component fatigue load calculation control block 58. The component fatigue load calculation control block 58 assesses the fatigue load of the components in the turbine during a time span until a next maintenance event. In the event the fatigue load level exceeds a desired target level, an updated parameter schedule $P_{desired}(v)$ will be determined in a parameter schedule profile calculation control block 60. Information concerning the updated parameter schedule $P_{desired}(v)$ will be transmitted to the power management system 10 controlling the pitch angle and the rotational speed of the turbine 62.

Figure 7:
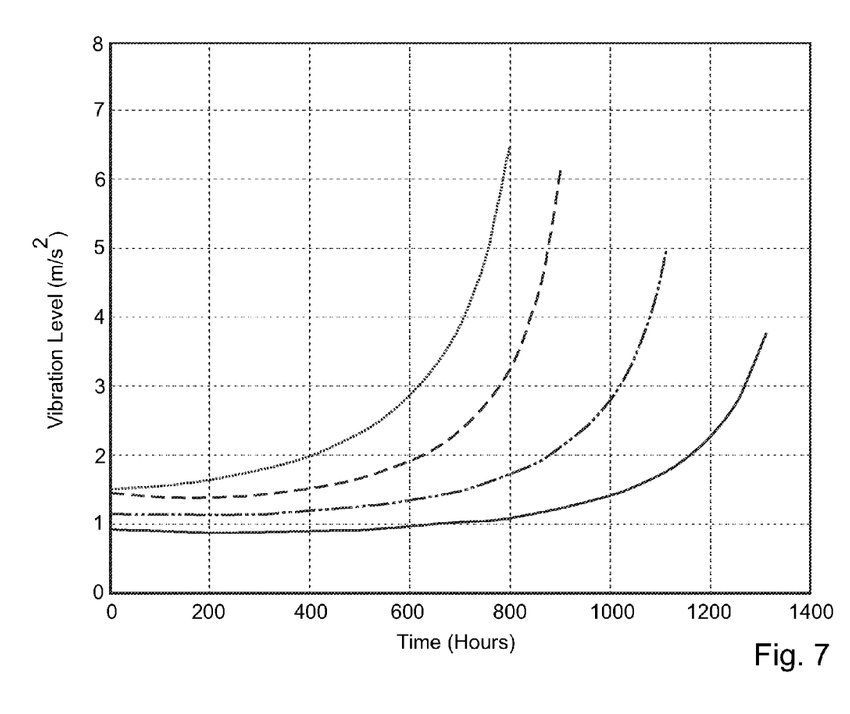
FIG. 7 shows a diagram over the vibration level as a function of running hours for different fault condition of wind power components.

FIG. 7 shows a diagram over the vibration level as a function of running hours for different fault conditions of wind power components. An corresponding equation to express the relationship of gearbox vibration level, fatigue load, and the component residual lifetime for gearbox intermediate bearing stalling failure mode using the statistical method based on historical data can be expressed as:

$$A_k = W_{0k}/(1 + W_{1k}T + W_{2k}T^2 + \dots)$$

Where $A_k$ is the vibration level of the component at fatigue load limit $L_K$, K refers to the equivalent fatigue load level. In the example forming basis for the diagram, k=4 represents 4 limits of the equivalent fatigue load. $W_{jk}$ is the weighting factors that will be different for different fatigue load limits K as shown in the figure below. J is the order of the equation. (j=0, 1, 2 for this example). The example shows that in order to achieve the residual lifetime of 1.5 months, the desired fatigue load level should be reduced by 40% with respect to fatigue load limit of $L_3$. Different components and failure modes, a totally different statistical model of the relationship can be established. By detecting operational data of a particular wind turbine component a specific fault condition $C_{ij}$ may be determined. Here $C_{ij}$ represents the fault condition i for component j. When a specific fault condition is present a correct equation determining the calculation of the fatigue of the component may be selected from the database.

Equation below shows another possible non-statistical expression of residual lifetime for the failure mode of crack formed by the accumulated damage from design point of view.

$$T = \frac{dD}{f(L/L_{material}, D_{current}, \sigma)}$$

Where L is the fatigue load limit, $L_{materials}$ is the material's tensile strength. D is the degree of the current damage which will be decided through condition monitoring system. Is the cyclic stress range of the component. The function f(.) can be defined through component design simulation and calculation.

The invention claimed is:

1. A method of operating a wind power plant, comprising:
operating the wind power plant at a current parameter schedule, wherein the wind power plant comprises a wind power plant component;
predicting wind data at the wind power plant for a time frame extending to a future time to determine predicted wind conditions during said time frame;
determining a desired fatigue load level of the wind power plant component at the future time; and
during the operation of said wind power plant, updating the current parameter schedule by generating an updated parameter schedule to provide a fatigue load level of the wind power plant component consistent with the desired fatigue load level at the future time if the wind turbine plant is exposed to the predicted wind conditions during said time frame.

2. The method of claim 1, further comprising sensing operational data of the wind power plant component and determining whether a fault condition for a wind power component is present based on said operational data.

3. A method of operating a wind power plant, comprising:
operating the wind power plant at a current parameter schedule, wherein the wind power plant comprises a wind power plant component;
predicting wind data at the wind power plant for a time frame extending to a future time to determine predicted wind conditions during said time frame;
determining a desired fatigue load level of the wind power plant component at the future time;
during the operation of said wind power plant, updating the current parameter schedule by generating an updated parameter schedule to provide a fatigue load level of the wind power plant component consistent with the desired fatigue load level at the future time if the wind turbine plant is exposed to the predicted wind conditions during said time frame; and
sensing operational data of the wind power plant component and determining whether a fault condition for a wind power component is present based on said operational data,
wherein the determining the desired fatigue load level and the updating the current parameter schedule are performed upon detection of the fault condition.

4. The method of claim 1, wherein the desired fatigue load level at the future time is determined based on a maintenance schedule.

5. The method of claim 1, further comprising calculating a desired time interval that is needed before maintenance of the wind power plant in order to optimize operation and maintenance cost with consideration of the predicted wind condition.

6. The method of claim 5, further comprising determining said future time from said desired time interval.

7. The method of claim 5, further comprising calculating a predicted fatigue load level of said wind power plant component at said future time, wherein the predicted fatigue load level being a fatigue load level of the wind power plant component at said future time when the wind turbine plant operates at the current parameter schedule and being is exposed to the predicted wind conditions during said time frame.

8. The method of claim 7, wherein said predicted fatigue load level corresponds to a residual lifetime at said future time, wherein the residual life is how long the wind turbine plant component predicted to be operable before a fatigue limit of the wind turbine plant component is reached.

9. A method of operating a wind power plant, comprising:
operating the wind power plant at a current parameter schedule, wherein the wind power plant comprises a wind power plant component;
predicting wind data at the wind power plant for a time frame extending to a future time to determine predicted wind conditions during said time frame;
determining a desired fatigue load level of the wind power plant component at the future time;
during the operation of said wind power plant, updating the current parameter schedule by generating an updated parameter schedule to provide a fatigue load level of the wind power plant component consistent with the desired fatigue load level at the future time if the wind turbine plant is exposed to the predicted wind conditions during said time frame;
calculating a desired time interval that is needed before maintenance of the wind power plant in order to optimize operation and maintenance cost with consideration of the predicted wind condition;
calculating a predicted fatigue load level of said wind power plant component at said future time, wherein the predicted fatigue load level being a fatigue load level of the wind power plant component at said future time when the wind turbine plant operates at the current parameter schedule and is exposed to the predicted wind conditions during said time frame,
wherein said updated parameter schedule is generated as a function of a difference between a residual lifetime and a next maintenance event in a maintenance schedule.

10. The method of claim 9, further comprising determining said next maintenance event in dependence of said residual lifetime.

11. The method of claim 7, further comprising deriving at least one of the desired fatigue load level and the predicted fatigue load level from a model describing fatigue load on said wind power plant component in dependence of the wind data.

12. The method of claim 3, wherein the desired fatigue load level at the future time is determined based on a maintenance schedule.

13. The method of claim 3, further comprising calculating a desired time interval that is needed before maintenance of the wind power plant in order to optimize operation and maintenance cost with consideration of the predicted wind condition.

14. The method of claim 13, further comprising determining said future time from said desired time interval.

15. The method of claim 9, wherein the determining the desired fatigue load level and the updating the current parameter schedule are performed upon detection of a fault condition.

* * * * *